United States Patent
Srivastava et al.

(10) Patent No.: US 10,091,250 B2
(45) Date of Patent: Oct. 2, 2018

(54) PROXY PERSONA TO AID FACILITATION OF CAPTURING INFORMATION ON BEHALF OF AN END USER DURING REAL TIME COLLABORATION

(71) Applicant: International Business Machines Corporation, Armonk, NY (US)

(72) Inventors: Dhanashree Srivastava, Pune (IN); Amy D. Travis, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 14/790,148

(22) Filed: Jul. 2, 2015

(65) Prior Publication Data
US 2017/0006069 A1  Jan. 5, 2017

(51) Int. Cl.
*H04L 29/06* (2006.01)

(52) U.S. Cl.
CPC ........ *H04L 65/105* (2013.01); *H04L 65/1069* (2013.01); *H04L 65/403* (2013.01)

(58) Field of Classification Search
CPC .................................................... H04L 65/105
USPC ......................................................... 709/204
See application file for complete search history.

(56) References Cited

U.S. PATENT DOCUMENTS

| | | | | |
|---|---|---|---|---|
| 5,809,492 A | * | 9/1998 | Murray | G06N 5/022 706/45 |
| 7,436,947 B2 | * | 10/2008 | Ordille | G06F 17/30864 370/465 |
| 7,590,230 B1 | | 9/2009 | Surazski | |
| 8,205,163 B2 | | 6/2012 | Shaffer et al. | |
| 8,224,904 B2 | | 7/2012 | Samdadiya et al. | |
| 8,700,711 B2 | | 4/2014 | Travis et al. | |
| 8,717,403 B1 | * | 5/2014 | Kalevo | H04N 7/15 348/14.02 |
| 8,781,841 B1 | | 7/2014 | Wang | |

(Continued)

FOREIGN PATENT DOCUMENTS

EP  2538625 A2  12/2012

OTHER PUBLICATIONS

MessageGears, "On Behalf Of", docs.messagegears.com (3 pages).*

(Continued)

*Primary Examiner* — Wing F Chan
*Assistant Examiner* — Leon Y Tseng
(74) *Attorney, Agent, or Firm* — Erik K. Johnson; Reza Sarbakhsh

(57) ABSTRACT

A method for enabling a user to create a proxy persona to attend a meeting on behalf of the user, whereby the meeting is associated with a communication system for requesting a person to be available for a scheduled event is provided. The method may include providing a user interface (UI) to enable the user to create the proxy persona and a plurality of predetermined configuration rules. The method may also include activating the proxy persona in response to a manual activation by the user or an automatic activation based on the plurality predetermined configuration rules being satisfied. The method may further include authorizing the proxy persona to participate in the meeting on behalf of the user, wherein the authorization is in response to the proxy persona being activated.

20 Claims, 5 Drawing Sheets

(56) References Cited

U.S. PATENT DOCUMENTS

| | | | |
|---|---|---|---|
| 2007/0055730 A1* | 3/2007 | Bagley | G06Q 10/10 |
| | | | 709/204 |
| 2007/0233786 A1* | 10/2007 | Rothley | G06Q 10/06 |
| | | | 709/204 |
| 2008/0127231 A1* | 5/2008 | Shaffer | G06Q 10/109 |
| | | | 719/328 |
| 2009/0119246 A1 | 5/2009 | Kansal | |
| 2013/0139071 A1 | 5/2013 | Hoff et al. | |
| 2013/0325972 A1 | 12/2013 | Boston et al. | |
| 2014/0215353 A1 | 7/2014 | Banatwala et al. | |
| 2015/0195312 A1 | 7/2015 | Banatwala et al. | |
| 2016/0110685 A1 | 4/2016 | Banatwala et al. | |

OTHER PUBLICATIONS

Anonymous, "A System for Predictively Recording Meetings of Interest," an IP.com Prior Art Database Technical Disclosure, Dec. 3, 2010, p. 1-3, IP.com No. 000202101.

Mell et al., "The NIST Definition of Cloud Computing," National Institute of Standards and Technology, Sep. 2011, p. 1-3, Special Publication 800-145.

* cited by examiner

PROXY PERSONA TO AID FACILITATION OF CAPTURING INFORMATION ON BEHALF OF AN END USER DURING REAL TIME COLLABORATION

BACKGROUND

The present invention relates generally to the field of computers, and more particularly to online communication systems.

When people work in global environments, activities happen around the clock, even though not all participants are present. When someone is not available for a meeting, or misses a chat, there is no easy way for them to catch up.

Email systems (and phone systems, as well) have had out of office (OOO) capabilities for a long time. People manually enable these while going away from work, and mail systems send pre-configured response to any mail that a user receives until the setting is enabled, or phone systems redirect to the appropriate people. These features let the sender know that this person is away, and also, in some cases, redirect content to someone present who can handle the information.

SUMMARY

According to one embodiment, a method for enabling a user to create a proxy persona to attend an online meeting, participate in an instant messaging session, or attend a phone call on behalf of the user, whereby the online meeting, instant messaging session, or phone call is associated with a communication system is provided. The method may include providing a user interface (UI) to enable the user to create the proxy persona and a plurality of predetermined configuration rules. The method may also include activating the proxy persona in response to a manual activation by the user or an automatic activation based on the plurality predetermined configuration rules being satisfied. The method may further include authorizing the proxy persona to participate in the meeting, instant messaging session, or phone call on behalf of the user, wherein the authorization is in response to the proxy persona being activated.

According to another embodiment, a computer system for enabling a user to create a proxy persona to attend an online meeting, participate in an instant messaging session, or attend a phone call on behalf of the user, whereby the online meeting, instant messaging session, or phone call is associated with a communication system is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include providing a user interface (UI) to enable the user to create the proxy persona and a plurality of predetermined configuration rules. The method may also include activating the proxy persona in response to a manual activation by the user or an automatic activation based on the plurality predetermined configuration rules being satisfied. The method may further include authorizing the proxy persona to participate in the online meeting, instant messaging session, or phone call on behalf of the user, wherein the authorization is in response to the proxy persona being activated.

According to yet another embodiment, a computer program product for enabling a user to create a proxy persona to attend an online meeting, participate in an instant messaging session, or attend a phone call on behalf of the user, whereby the online meeting, instant messaging session, or phone call is associated with a communication system is provided. The computer program product may include one or more computer-readable storage devices and program instructions stored on at least one of the one or more tangible storage devices, the program instructions executable by a processor. The computer program product may include program instructions to provide a user interface (UI) to enable the user to create the proxy persona and a plurality of predetermined configuration rules. The computer program product may also include program instructions to activate the proxy persona in response to a manual activation by the user or an automatic activation based on the plurality predetermined configuration rules being satisfied. The computer program product may further include program instructions to authorize the proxy persona to participate in the online meeting, instant messaging session, or phone call on behalf of the user, wherein the authorization is in response to the proxy persona being activated.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
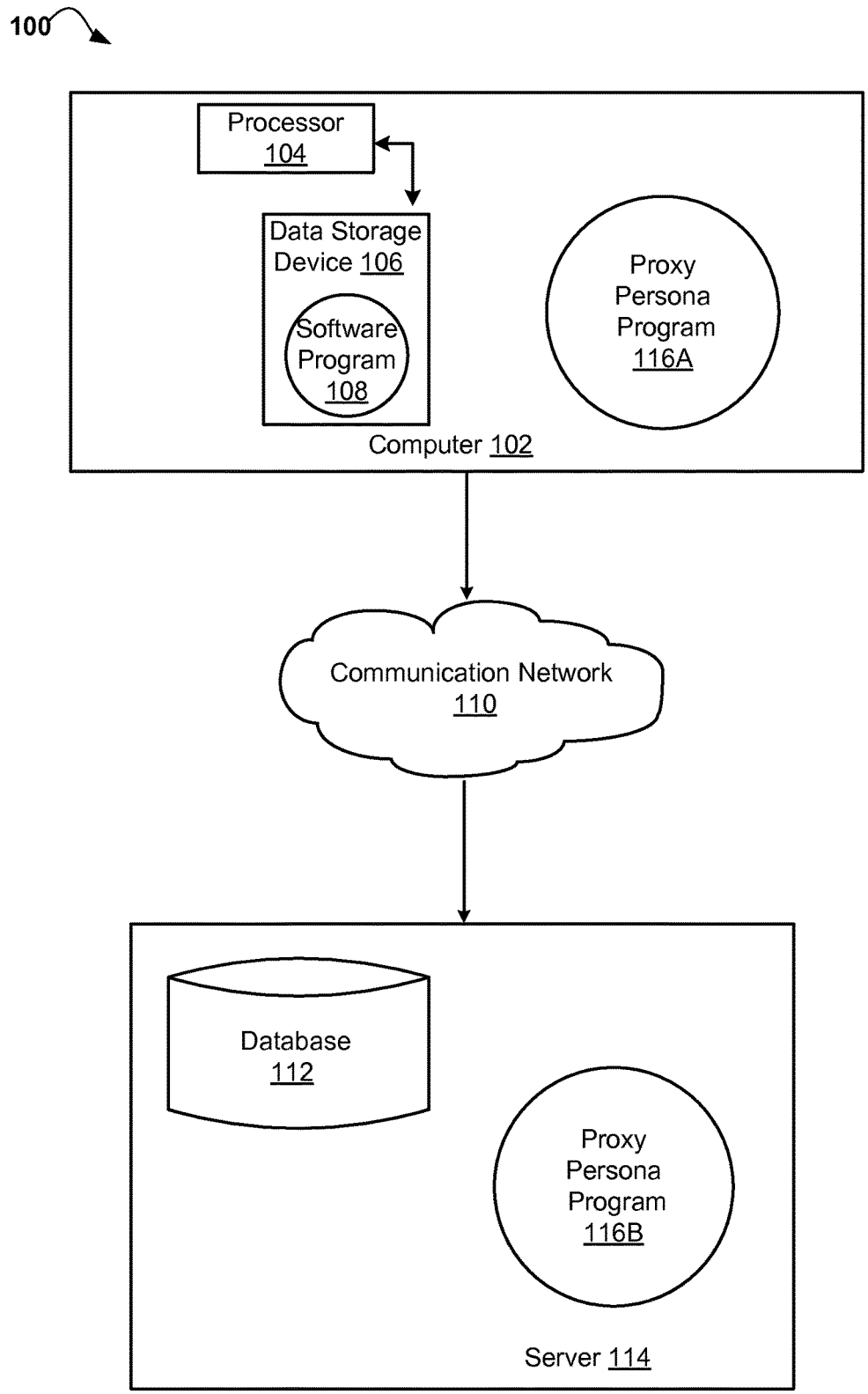
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to online communication systems. The following described exemplary embodiments provide a system, method and program product to, among other things, provide the capability to enable a proxy persona (i.e., persona) for users in an enterprise to aid facilitation of capturing information on behalf of the user during real time collaboration that happens when the user is away. Therefore, the present embodiment has the capacity to improve the technical field of online communication systems by providing a way to create a proxy persona for employees in an organization. More specifically, the present embodiment may enable the proxy persona to step in for an actual user during the user's absence. Additionally, the proxy persona may participate in meetings (i.e., any meeting associated with an electronic communication system including, but not limited to a phone call/conversation, an email service, an instant messaging service or session, a social network service, an online meeting, a video conference, a telephone conference, or a web-based conference service) and capture information on the user's behalf.

As previously described, activities occur around the clock in a global environment, even though not all participants are present. When someone is not available for a meeting, or misses a chat, there is no easy way for them to catch up. Email systems (and phone systems, as well) have had out of office (OOO) capabilities for a long time. As such, users can manually enable the OOO capabilities and mail systems will send pre-configured response to any mail that a user receives while away until the setting is enabled. With respect to phone systems, the calls can be redirected to the appropriate people. These features let the sender know that this person is away, and also, in some cases, redirect content to someone present who can handle the information.

However, the OOO model, or away systems for phone services do not account for the real time collaboration (e.g., chats/meetings/web conferences) that happen during this absence period. Therefore, the person who sets this OOO may not receive information pertaining to any conversations, meetings, or conferences during his/her absence. As such, people may have to manually catch up with other team members for any conversations or decisions that were taken during their out of office period. Furthermore, if important decisions are not well communicated during a person's absence, then such lack of communication may lead to loss of productivity and business for companies.

As such, it may be advantageous, among other things, to create a proxy persona for employees in an organization that can step in for an actual user during the user's absence and participate in instant messaging, phone conversations, or web conferencing systems (e.g., online meetings or instant messaging chats) so as to capture information on the user's behalf.

According to at least one implementation, the present embodiment may enable a user (i.e., an end user), who may be employed by an enterprise, to create a connected persona (i.e., a persona, a proxy, or proxy persona), and control the persona so that the persona may act as a proxy for them by attending instant messaging, phone conferencing systems, or web conferencing systems (e.g., online meetings or instant messaging chats) on behalf of the end user. As such, the persona may attend meetings or any kind of real time collaboration via any online communication system including, but not limited to, email, phone, instant messaging, social network, web-based, online meetings, video conference or telephone conference. As such, for example, the entire phone calls or meetings may be recorded, the chats may be joined (thus saving the conversation), and the user may even, in some instances, be alerted in real-time to important information that might otherwise be missed. Additionally, the persona may be associated with a visual indicator that may notify the other participants as to the proxies that are collaborating on behalf of the user. As such, the other participants may know that it is the persona and not the actual user who is a part of the information exchange. For example, according to various implementations of the present embodiment, the persona may have a special symbol or different visual indicator next to their name and/or the word 'proxy' next to their name in an instant message contact list or meeting list to distinguish online personas from real users.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to provide the capability to enable a proxy persona for users in an enterprise to aid facilitation of capturing information on behalf of the user during real time collaboration that happens when the user is away. As such, every enterprise user could create a connected persona that may act as a proxy for them, attending meetings and phone calls (thus recording them), joining chats (thus saving the conversation), and even alerting the user in real-time to important information that might otherwise be missed. Additionally, the persona could be associated with a visual indicator that lets the others who are collaborating know that it is the persona and not the actual user who is a part of the information exchange.

According to at least one implementation, the present embodiment may allow a proxy persona to be created for a user who is away or busy with something else and unable to participate in the collaboration and exchange of information at that point of time. Therefore, the persona can aid in facilitation of capturing information on behalf of the user during real time collaboration that happens when the user is away. As such, a user may create a "persona" via a graphical user interface, for example, that can be set to 'available' when they are away. Then, once the persona has been created, the persona can be activated manually or may be rule-driven to account for certain times when the user logs off of a particular system, when the user's computer shows inactivity, or other activity indicating that the user is not active. Additionally, the persona can also be activated by a traditional OOO setting. According to the present embodiment, the persona can be applied to: meetings already scheduled, new meetings, and n-way chat conversations (includes a 1:1 chat conversation too). Additionally, configuration settings can indicate rules for when to join these meetings. For example: 1) if my boss will be there, 2) if the topic discussed will be "x", 3) if I am the only person from my department invited. However, when the persona joins the meetings, the persona may join with a visually distinct identifier, so other users know it is the persona and not the real person attending the meeting.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a Proxy Persona Program 116A. The networked computer environment 100 may also include a server 114 that is enabled to run a Proxy Persona Program 116B that may interact with a database 112 and a communication network 110. The networked computer environment 100 may include a plurality of computer 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Proxy Persona Program 116B running on server computer 114 via the communications network 110. The communications network 110 may include connections, such as wire, wireless communication links, or fiber optic cables. As will be discussed with reference to FIG. 3, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Proxy Persona Program 116A, 116B may interact with a database 112 that may be embedded in various storage devices, such as, but not limited to a computer/mobile device 102, a networked server 114, or a cloud storage service.

As previously described, the client computer 102 may access the Proxy Persona Program 116B, running on server computer 114 via the communications network 110. For example, a user using a client computer 102 may utilize the Proxy Persona Program 116A, 116B to create a proxy persona that can step in for the user during the user's absence and participate in instant messaging, phone conferencing systems, or web conferencing systems so as to capture information on the user's behalf. The Proxy Persona method is explained in more detail below with respect to FIG. 2.

Figure 2:
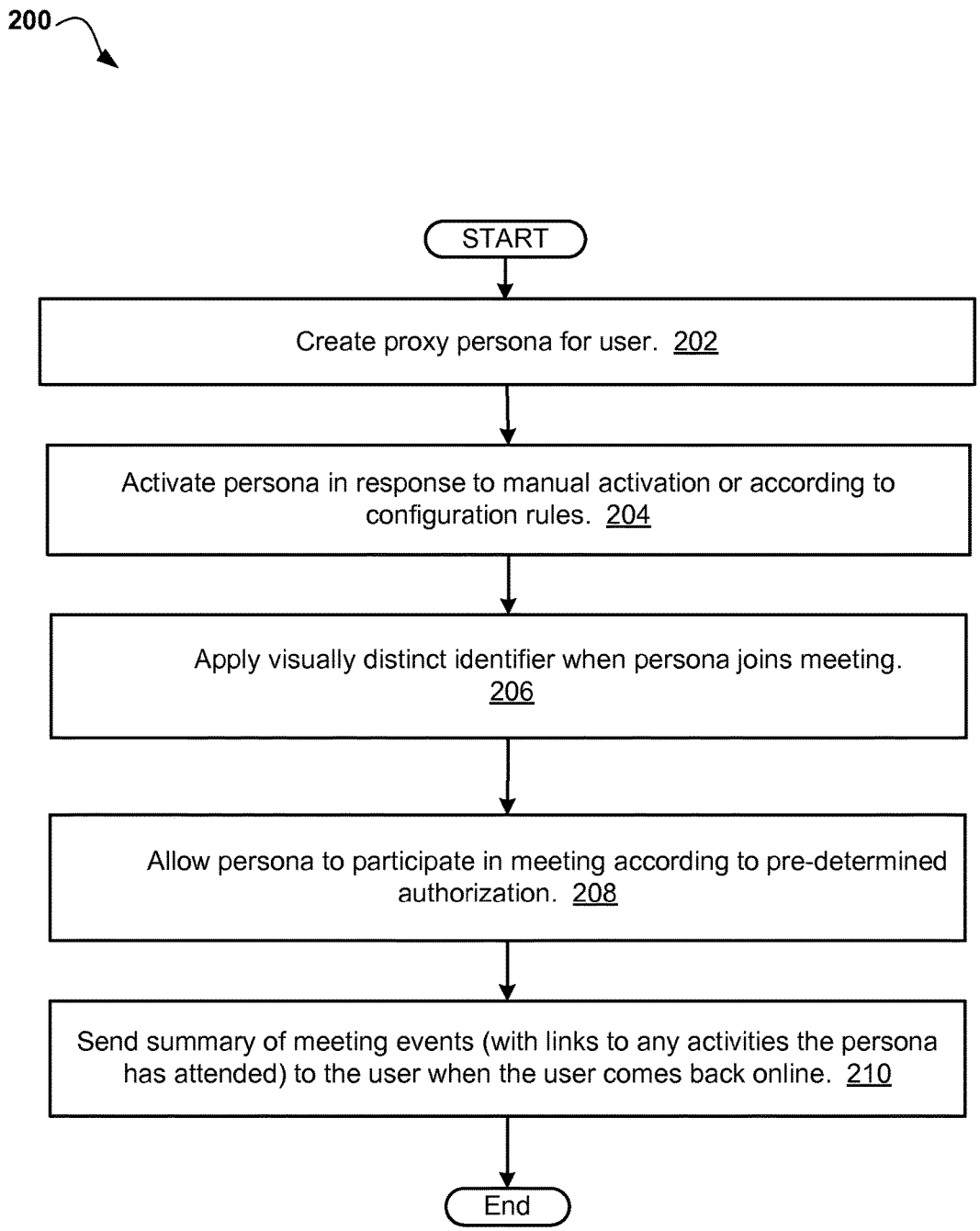
FIG. 2 is an operational flowchart illustrating the steps carried out by a program that enables a user to create a proxy persona to attend a meeting on behalf of the user according to at least one embodiment.

Referring now to FIG. 2, an operational flowchart 200 illustrating the steps carried out by a program that enables a user to create a proxy persona to attend a meeting on behalf of the user. As previously described, the Proxy Persona Program 116A, 116B (FIG. 1) may create a proxy persona for employees in an organization that can step in for an actual user during the user's absence and participate in any meeting associated with an electronic communication system including, but not limited to a phone call/conversation, an email service, an instant messaging service or session, a social network service, an online meeting, a video conference, a telephone conference, or a web-based conference service so as to capture information on the user's behalf.

Therefore with respect to FIG. 2 at 202, the Proxy Persona Program 116A, 116B (FIG. 1) may enable a user, via a graphical user interface, for example, to create a proxy persona. According to at least one implementation, the proxy persona may be set to 'available' when the user is away. Additionally, the user may be prompted to also set predetermined configuration rules that may determine how and when the proxy persona is activated. Therefore, once the persona has been created, the persona can be activated manually or may be rule-driven to account for certain times when the user logs off of a particular system, when the user's computer shows inactivity, or other activity indicating that the user is not active. Additionally, the persona can also be activated by a traditional OOO setting.

Therefore, at 204, the Proxy Persona Program 116A, 116B (FIG. 1) may activate the persona in response to either a manual activation by the user or according to predefined configuration rules. According to at least one implementation, conditions may be defined for a persona to join web meetings. For example, the persona may join web meetings or phone meetings based on the following predetermined conditions, rules or analytics:

Recurring meetings: The user (i.e., the person who is away) had accepted the recurring meeting invite before going away.

Delegates: The person delegates explicitly to their persona to join the meeting.

Rule Driven: The user can define rules such that if a meeting request satisfies the following rule: "invitation from userX OR roleA OR subject=FeatureA||FeatureB" then auto accept for persona to join.

Analytics driven: An analytics engine can run in background to understand what kind of meetings will a user want to be in while trigger the auto-acceptance for OOO persona to join it.

Additionally with respect to a person in an instant message chat, the following predetermined conditions, rules or analytics may apply:

Configuration settings: Configuration settings to "always" accept chat invites from any users.

Manual based on predetermined conditions: Chat moderator can invite persona of a user if user has "allowed" it while setting out of office settings.

Rule Driven: The joining of chat by persona can be rule driven. A typical rule to join a chat session is: "if invitation from userX or teanA or roleA or IN(userA, userB, userC, teamA . . . )."

Then at 206, the Proxy Persona Program 116A, 116B (FIG. 1) applies a visually distinct identifier when the persona joins the meeting. For example, according to various implementations of the present embodiment, the persona may have a special symbol or different visual indicator next to their name and/or the word 'proxy' next to their name in an instant message contact list or meeting list to distinguish online personas from real users.

Next at 208, the Proxy Persona Program 116A, 116B (FIG. 1) allows the persona to participate in the meeting according to the pre-determined authorization. Therefore the persona may be allowed to participate in the meeting according to predefined configuration rules that define the level of authority that the persona will have during the meeting. For example, the present embodiment provides the end user with the ability to configure the persona for various actions to be taken (such as what collaborations to be a part of; what to do when participating in the different types of collaboration (meetings v/s phones v/s emails); and when to alert the user).

Next at 210, the Proxy Persona Program 116A, 116B (FIG. 1) sends a summary of the meeting events (with links to any activities the persona has attended) to the user when the user comes back online.

According to the present embodiment, the persona can record the proceedings of the meeting (e.g., audio, video, text transcription). The persona can also watch for distinct keywords that might require more immediate action, and alert the user based on personal settings—for example, send me an email with a pointer to the meeting recording and the time that this keyword was mentioned, so I can jump right in to that part of the conversation. Or, if my boss says the following, then please SMS me, so I know to join in.

For chat systems, the persona may stay online (again with visual distinction) when the user is not online. When other users send a chat invitation to an n-way chat to this user, the persona joins, and saves the chat, or acts based on keywords, etc. Specific keywords may be defined to alert the user, such as "#contact-now" followed by a message in chat, which would send an SMS message to the person telling them that they were needed for the conversation.

Additionally, the persona can be configured to know if important people are trying to reach out to the user for urgent matters and respond to them with your contact details. Then when the user comes back online, a summary may be given to the user with links to any activities that the persona attended.

It may be appreciated that FIG. 2 provides only an illustration of one implementation and does not imply any limitations with regard to how different embodiments may be implemented. Many modifications to the depicted environments may be made based on design and implementation requirements. For example, as previously described, the persona can be activated manually or may be rule-driven to account for certain times when the user logs off of a particular system, when the user's computer shows inactivity, or other activity indicating that the user is not active. Additionally, the persona can also be activated by a traditional OOO setting.

Additionally, the present embodiment may useful since the user may otherwise miss important conversations and at times be completely unaware of important decisions while they are away. Currently, even after knowing that any such meeting has taken place in the user's absence, a user has to locate people to know what was really discussed. However, many times people do not remember exact discussions or the real decision may not be communicated at all. Additionally, sometimes context of a decision is left out which is a critical piece of the decision. In meetings, a decision is reached after following multiple threads and multiple conversations. The recording of proceedings through a persona may aid in understanding all the different threads of the conversation that were used to arrive at the decision.

As such, according to various implementations of the present embodiment, an enterprise user may never miss out on important information that was exchanged in their absence because of being unable to attend a meeting or a phone call. Additionally, in a 24×7 global enterprise where teams work across different time zones, the present embodiment may facilitate effective communication between global teams because users in other time zones can activate their personae and gain access to all the information exchange that happened while they were away. Significantly, the present embodiment may allow every enterprise user to create a connected persona, set rules around the persona activation and participation in collaboration in the user's absence, and alert the enterprise user in case pre-defined important events occur. As previously described, parameters may be defined that provide the ability for an end user to create a connected persona that can be activated based on a set of rules to participate in all kinds of real time collaboration. Additionally, the present embodiment provides the end user with the ability to configure the persona for various actions to be taken (such as what collaborations to be a part of; what to do when participating in the different types of collaboration (meetings v/s phones v/s emails); and when to alert the user).

Figure 3:
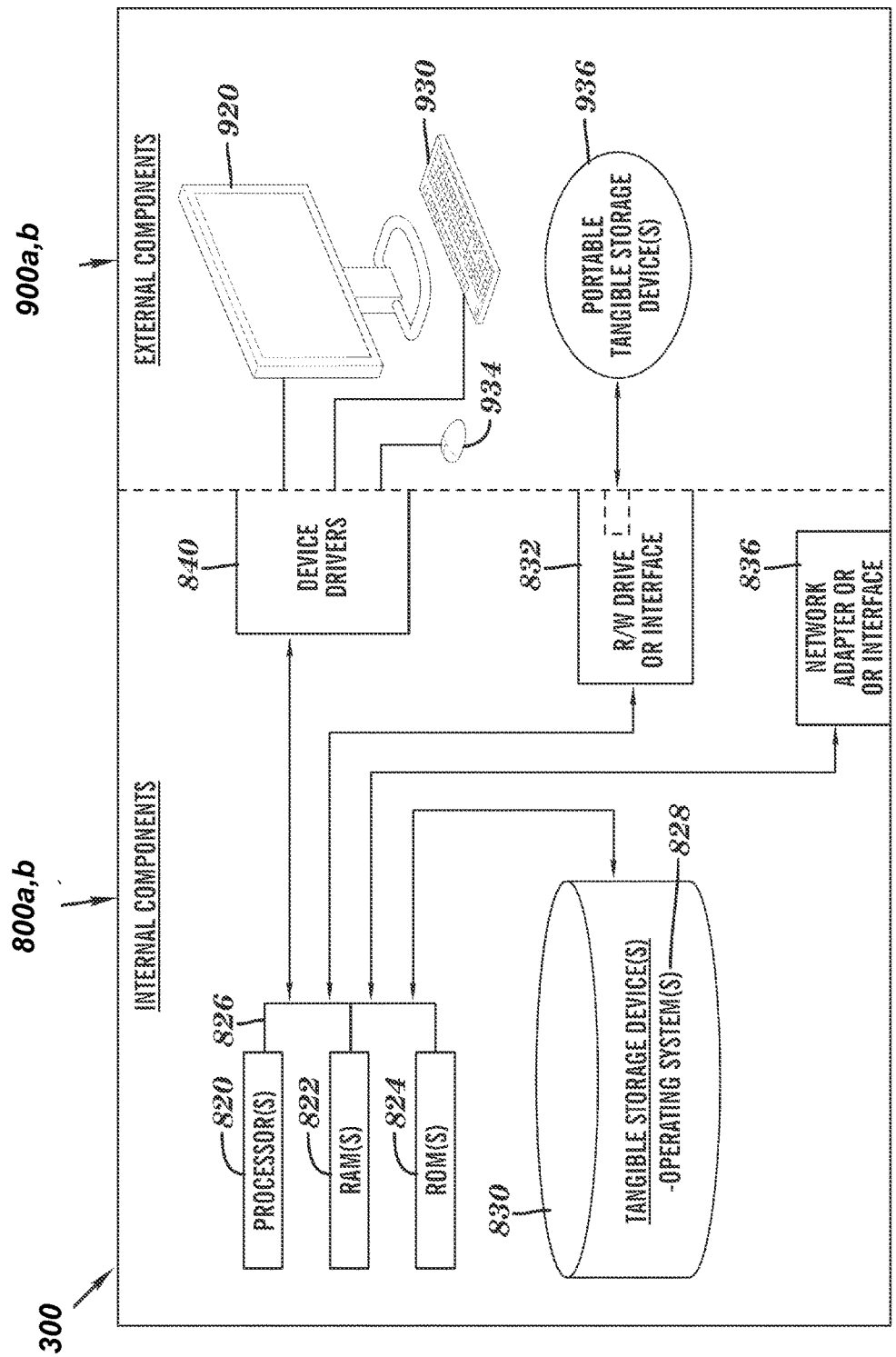
FIG. 3 is a block diagram of internal and external components of computers and servers depicted in FIG. 1 according to at least one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 a,b and external components 900 a,b illustrated in FIG. 3. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Proxy Persona Program 116A (FIG. 1) in client computer 102 (FIG. 1) and the Proxy Persona Program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Proxy Persona Program 116A, 116B (FIG. 1) can be stored on one or more of the respective portable computer-readable tangible storage devices 936, read via the respective R/W drive or interface 832 and loaded into the respective hard drive 830.

Each set of internal components 800 a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Proxy Persona Program 116A (FIG. 1) in client computer 102 (FIG. 1) and the Proxy Persona Program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Proxy Persona Program 116A (FIG. 1) in client computer 102 (FIG. 1) and the Proxy Persona Program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 *a,b* can include a computer display monitor 920, a keyboard 930, and a computer mouse 934. External components 900 *a,b* can also include touch screens, virtual keyboards, touch pads, pointing devices, and other human interface devices. Each of the sets of internal components 800 *a,b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
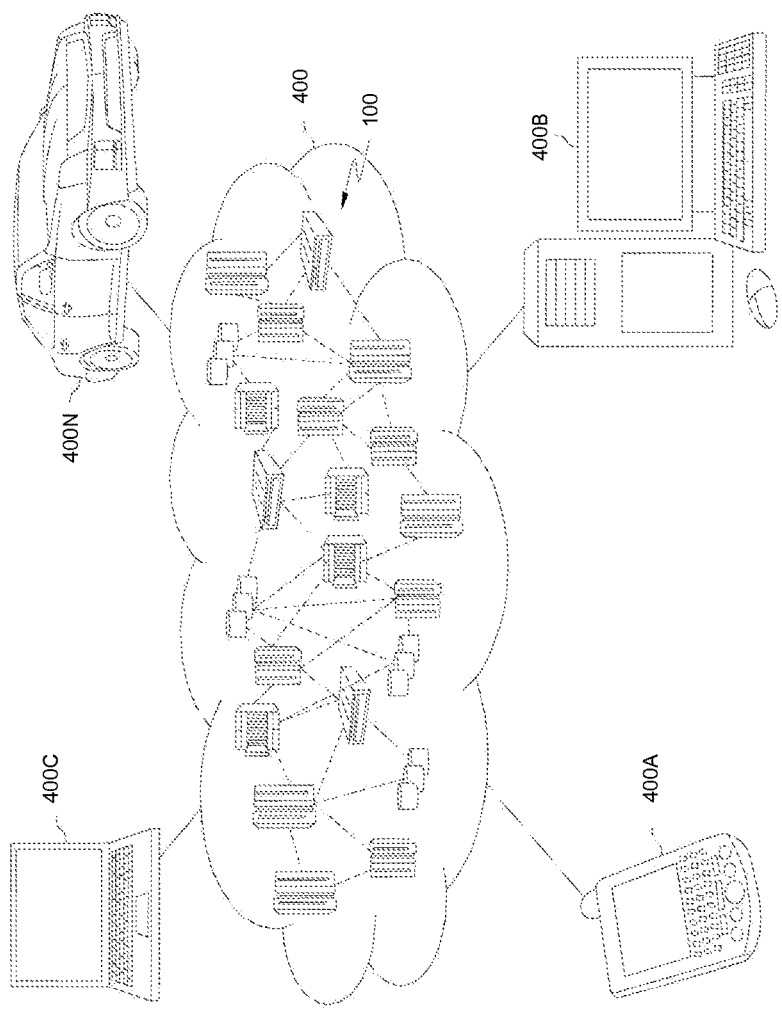
FIG. 4 is a block diagram of an illustrative cloud computing environment including the computer system depicted in FIG. 1, in accordance with an embodiment of the present disclosure.

Referring now to FIG. 4, illustrative cloud computing environment 400 is depicted. As shown, cloud computing environment 400 comprises one or more cloud computing nodes 100 with which local computing devices used by cloud consumers, such as, for example, personal digital assistant (PDA) or cellular telephone 400A, desktop computer 400B, laptop computer 400C, and/or automobile computer system 400N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that computing nodes 100 and cloud computing environment 400 can communicate with any type of computerized device over any type of network and/or network addressable connection (e.g., using a web browser).

Figure 5:
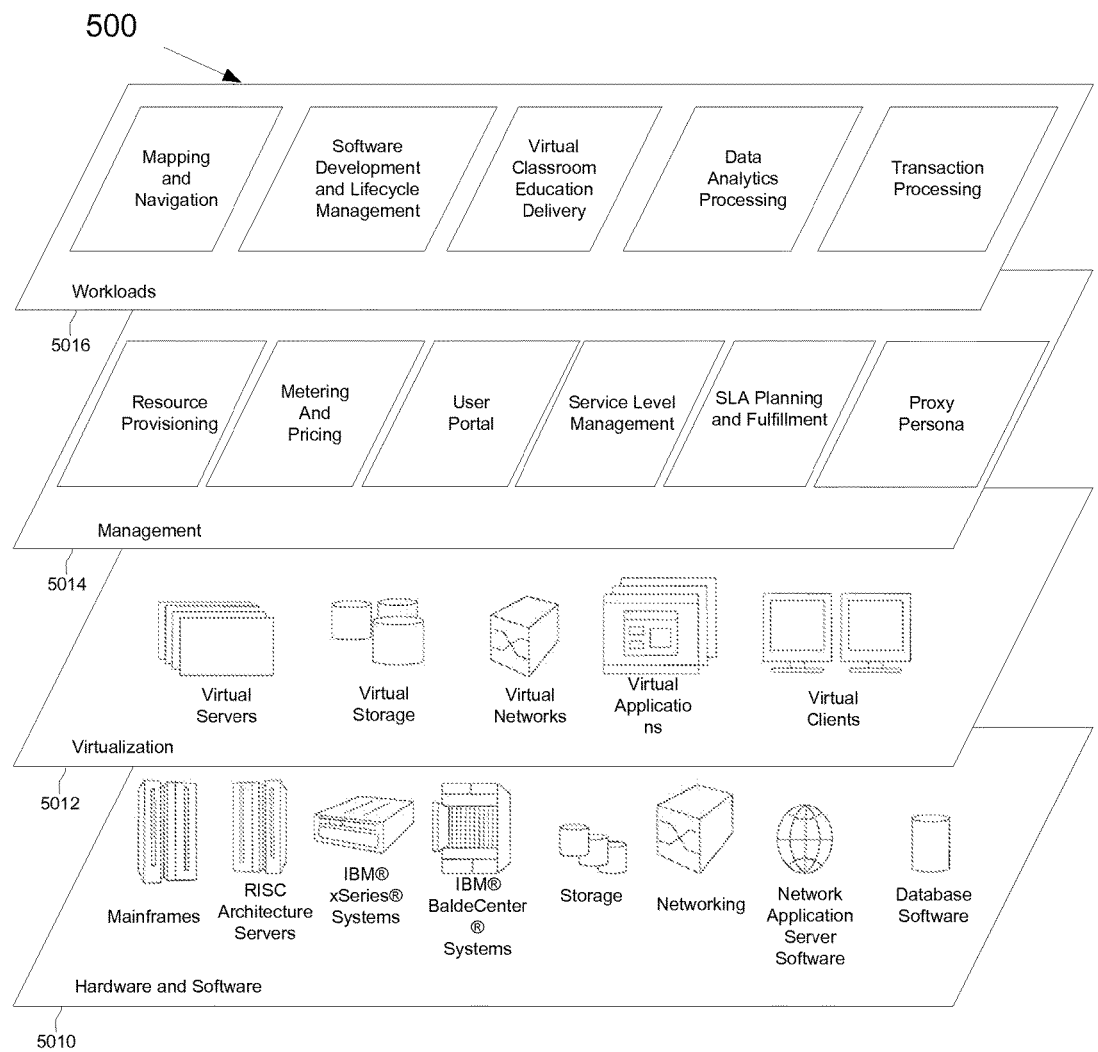
FIG. 5 is a block diagram of functional layers of the illustrative cloud computing environment of FIG. 4, in accordance with an embodiment of the present disclosure.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 5010 includes hardware and software components. Examples of hardware components include: mainframes; RISC (Reduced Instruction Set Computer) architecture based servers; storage devices; networks and networking components. In some embodiments, software components include network application server software.

Virtualization layer 5012 provides an abstraction layer from which the following examples of virtual entities may be provided: virtual servers; virtual storage; virtual networks, including virtual private networks; virtual applications and operating systems; and virtual clients.

In one example, management layer 5014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A Proxy Persona Program may create a proxy persona for employees in an organization that can step in for an actual user during the user's absence and participate in instant messaging, phone conferencing systems, or web conferencing systems so as to capture information on the user's behalf.

Workloads layer 5016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for enabling a user to create a proxy persona to attend an online meeting on behalf of the user, wherein the online meeting is associated with a communication system, the method comprising:

providing a user interface (UI) to enable the user to create the proxy persona and a plurality of predetermined configuration rules;

activating the proxy persona in response to a manual activation by the user or an automatic activation based on the plurality of predetermined configuration rules being satisfied;

authorizing the proxy persona to participate in a first type of collaboration associated with the online meeting and a second type of collaboration associated with the online meeting, wherein the first type of collaboration is different from the second type of collaboration, and wherein the authorization includes a level of authority that determines whether the proxy persona is a part of the first type of collaboration and the second type of collaboration and determines one or more first actions to take by the proxy persona while participating in the first type of collaboration that are different from one or more second actions to take by the proxy persona while participating in the second type of collaboration;

determining if one or more keywords are mentioned in an audio, video, or textual transcript of the first type of collaboration and second type of collaboration; and in response to determining the one or more keywords are mentioned, sending an online communication from the authorized proxy persona to the user, wherein the sent online communication provides a pointer to the meeting recording and the specific time during the meeting that the one or more keywords are mentioned.

2. The method of claim 1 further comprising:
sending a meeting summary to the user.

3. The method of claim 1 further comprising:
alerting the user in real-time to a plurality of information associated with the online meeting.

4. The method of claim 1, further comprising:
applying a visually distinct identifier when the proxy persona is activated.

5. The method of claim 1, wherein the plurality of predetermined configuration rules comprises at least one of a plurality of conditions, a plurality of rules; and a plurality of analytics.

6. The method of claim 5, wherein the plurality of analytics are determined by an analytics engine.

7. The method of claim 6, wherein the analytics engine can trigger an auto-acceptance for the persona proxy to join the online meeting.

8. The method of claim 2, wherein the sent meeting summary comprises a plurality of links to a plurality of activities that the proxy persona has attended on behalf of the user.

9. The method of claim 1, wherein the online meeting comprises a meeting associated with an electronic communication system including at least one of a phone call, an email service, an instant messaging service, a social network service, an online meeting, a video conference, a telephone conference, or a web-based conference service.

10. A computer system for enabling a user to create a proxy persona to attend an online meeting on behalf of the user, wherein the online meeting is associated with a communication system, the computer system comprising:

one or more processors, one or more computer-readable memories, one or more computer-readable tangible storage devices, and program instructions stored on at least one of the one or more computer-readable tangible storage devices for execution by at least one of the one or more processors via at least one of the one or more memories, wherein the computer system is capable of performing a method comprising:

providing a user interface (UI) to enable the user to create the proxy persona and a plurality of predetermined configuration rules;

activating the proxy persona in response to a manual activation by the user or an automatic activation based on the plurality of predetermined configuration rules being satisfied;

authorizing the proxy persona to participate in a first type of collaboration associated with the online meeting and a second type of collaboration associated with the online meeting, wherein the first type of collaboration is different from the second type of collaboration, and wherein the authorization includes a level of authority that determines whether the proxy persona is a part of the first type of collaboration and the second type of collaboration and determines one or more first actions to take by the proxy persona while participating in the first type of collaboration that are different from one or more second actions to take by the proxy persona while participating in the second type of collaboration;

determining if one or more keywords are mentioned in an audio, video, or textual transcript of the first type of collaboration and second type of collaboration; and in response to determining the one or more keywords are mentioned, sending an online communication from the authorized proxy persona to the user, wherein the sent online communication provides a pointer to the meeting recording and the specific time during the meeting that the one or more keywords are mentioned.

11. The computer system of claim 10 further comprising: sending a meeting summary to the user.

12. The computer system of claim 10 further comprising: alerting the user in real-time to a plurality of information associated with the online meeting.

13. The computer system of claim 10, further comprising: applying a visually distinct identifier when the proxy persona is activated.

14. The computer system of claim 10, wherein the plurality of predetermined configuration rules comprises at least one of a plurality of conditions, a plurality of rules; and a plurality of analytics.

15. The computer system of claim 14, wherein the plurality of analytics are determined by an analytics engine.

16. The computer system of claim 15, wherein the analytics engine can trigger an auto-acceptance for the persona proxy to join the online meeting.

17. The computer system of claim 11, wherein the sent meeting summary comprises a plurality of links to a plurality of activities that the proxy persona has attended on behalf of the user.

18. The computer system of claim 10, wherein the online meeting comprises a meeting associated with an electronic communication system including at least one of a phone call, an email service, an instant messaging service, a social network service, an online meeting, a video conference, a telephone conference, or a web-based conference service.

19. A computer program product for enabling a user to create a proxy persona to attend an online meeting on behalf of the user, wherein the online meeting is associated with a communication system, the computer program product comprising:

one or more computer-readable storage devices and program instructions stored on at least one of the one or more computer-readable storage devices, the program instructions executable by a processor, the program instructions comprising:

program instructions to provide a user interface (UI) to enable the user to create the proxy persona and a plurality of predetermined configuration rules;

program instructions to activate the proxy persona in response to a manual activation by the user or an automatic activation based on the plurality of predetermined configuration rules being satisfied;

program instructions to authorize the proxy persona to participate in a first type of collaboration associated with the online meeting and a second type of collaboration associated with the online meeting, wherein the first type of collaboration is different from the second type of collaboration, and wherein the authorization includes a level of authority that determines whether the proxy persona is a part of the first type of collaboration and the second type of collaboration and determines one or more first actions to take by the proxy persona while participating in the first type of collaboration that are different from one or more second actions to take by the proxy persona while participating in the second type of collaboration;

program instructions to determine if one or more keywords are mentioned in an audio, video, or textual transcript of the first type of collaboration and second type of collaboration; and in response to determining the one or more keywords are mentioned, program instructions to send an online communication from the authorized proxy persona to the user, wherein the sent online communication provides a pointer to the meeting recording and the specific time during the meeting that the one or more keywords are mentioned.

20. The computer program product of claim 19, further comprising:

program instructions to send a meeting summary to the user.

* * * * *